US009047034B2

(12) United States Patent
Kodimer et al.

(10) Patent No.: US 9,047,034 B2
(45) Date of Patent: Jun. 2, 2015

(54) MOBILE DEVICE CONTROL OF MULTIFUNCTION PERIPHERAL OUTPUT

(71) Applicant: Toshiba Tec Kabushiki Kaisha, Shinagawa-ku, Tokyo (JP)

(72) Inventors: Marianne Kodimer, Huntington Beach, CA (US); Jeffrey Chan, Irvine, CA (US)

(73) Assignee: Toshiba Tec Kabushiki Kaisha, Tokyo (JP)

(*) Notice: Subject to any disclaimer, the term of this patent is extended or adjusted under 35 U.S.C. 154(b) by 30 days.

(21) Appl. No.: 13/922,893

(22) Filed: Jun. 20, 2013

(65) Prior Publication Data

US 2013/0342870 A1    Dec. 26, 2013

Related U.S. Application Data

(60) Provisional application No. 61/662,837, filed on Jun. 21, 2012.

(51) Int. Cl.
*G06F 3/12* (2006.01)
*H04N 1/00* (2006.01)

(52) U.S. Cl.
CPC ............ *G06F 3/1292* (2013.01); *G06F 3/1205* (2013.01); *G06F 3/1254* (2013.01); *H04N 1/00307* (2013.01); *H04N 1/0044* (2013.01); *H04N 1/00469* (2013.01); *H04N 2201/0094* (2013.01)

(58) Field of Classification Search
USPC .................................................. 358/1.1–3.29
See application file for complete search history.

(56) References Cited

U.S. PATENT DOCUMENTS

| | | | | |
|---|---|---|---|---|
| 6,631,375 | B2 * | 10/2003 | Jecha et al. | 1/1 |
| 2004/0190011 | A1 * | 9/2004 | Walker, Jr. | 358/1.2 |
| 2009/0225367 | A1 * | 9/2009 | Wada | 358/1.15 |
| 2012/0033262 | A1 * | 2/2012 | Sakurai | 358/1.15 |
| 2012/0040719 | A1 * | 2/2012 | Lee et al. | 455/557 |
| 2013/0124995 | A1 * | 5/2013 | Kelley | 715/718 |

* cited by examiner

*Primary Examiner* — Marcellus Augustin
(74) *Attorney, Agent, or Firm* — SoCal IP Law Group LLP; Steven C. Sereboff; Jonathan Pearce

(57) ABSTRACT

Systems and methods for mobile device control of multifunction peripheral output are disclosed. The method includes receiving interaction with a user interface resulting in user selection of viewing attributes for a document, the viewing attributes including a zoom level and a position of the document on the user interface, the viewing attributes together defining a view of the document visible on the user interface. The method further includes adjusting the user interface to display the document according to the view and receiving interaction with the user interface requesting transmission of the document to a multifunction peripheral for output, generating document output data comprising the document according to the view in a form suitable for operation by a multifunction peripheral and transmitting the document output data to a multifunction peripheral for output such that the document is output by the multifunction peripheral according to the view.

15 Claims, 9 Drawing Sheets

MOBILE DEVICE CONTROL OF MULTIFUNCTION PERIPHERAL OUTPUT

RELATED APPLICATION INFORMATION

This patent claims priority from U.S. Patent Application No. 61/662,837 entitled "Natural User Interface Method of Configuring Default Print Settings from a Mobile Device Image Viewing Application" filed Jun. 21, 2012.

BACKGROUND

1. Field

This disclosure relates to mobile device control of multifunction peripherals.

2. Description of the Related Art

A multifunction peripheral (MFP) is a type of document processing device which is an integrated device providing at least two document processing functions, such as print, copy, scan and fax. In a document processing function, an input document (electronic or physical) is used to automatically produce a new output document (electronic or physical).

Documents may be physically or logically divided into pages. A physical document is paper or other physical media bearing information which is readable unaided by the typical human eye. An electronic document is any electronic media content (other than a computer program or a system file) that is intended to be used in either an electronic form or as printed output. Electronic documents may consist of a single data file, or an associated collection of data files which together are a unitary whole. Electronic documents will be referred to further herein as documents, unless the context requires some discussion of physical documents which will be referred to by that name specifically.

In printing, the MFP automatically produces a physical document from an electronic document. In copying, the MFP automatically produces a physical document from a physical document. In scanning, the MFP automatically produces an electronic document from a physical document. In faxing, the MFP automatically transmits via fax an electronic document from an input physical document which the MFP has also scanned or from an input electronic document which the MFP has converted to a fax format.

MFPs are often incorporated into corporate or other organization's networks which also include various other workstations, servers and peripherals. An MFP may also provide remote document processing services to external or network devices.

MFPs are capable of output as directed by virtually any computing device. However, mobile devices have limited user interface space in which to provide directions to MFPs for any output derived from those mobile devices. Typical output devices, such as personal computers, have included one or more "print" or "fax" screens, usually provided by the manufacturer of the MPF as or in conjunction with a device driver. These screens enable a user to define various settings for document processing requests, such as, in the case of a print job, the number of copies, the level of zoom, double-sided printing and the like.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

DETAILED DESCRIPTION

Performing document processing operations directly from a mobile device enables users to avoid the hassle of moving documents from the mobile device to a computer suitably adapted to provide document processing requests to an MFP. In many situations, a user may receive a document at his or her mobile device via email. The user may then wish to print or to fax or store that document in a network or cloud location.

Outputting any document from a mobile device in a format desired by a user in the past has been difficult. Default options for output are simple, but providing a clear and easy-to-use method and system for outputting portions of documents or images has yet been difficult.

Description of Apparatus

Figure 1:
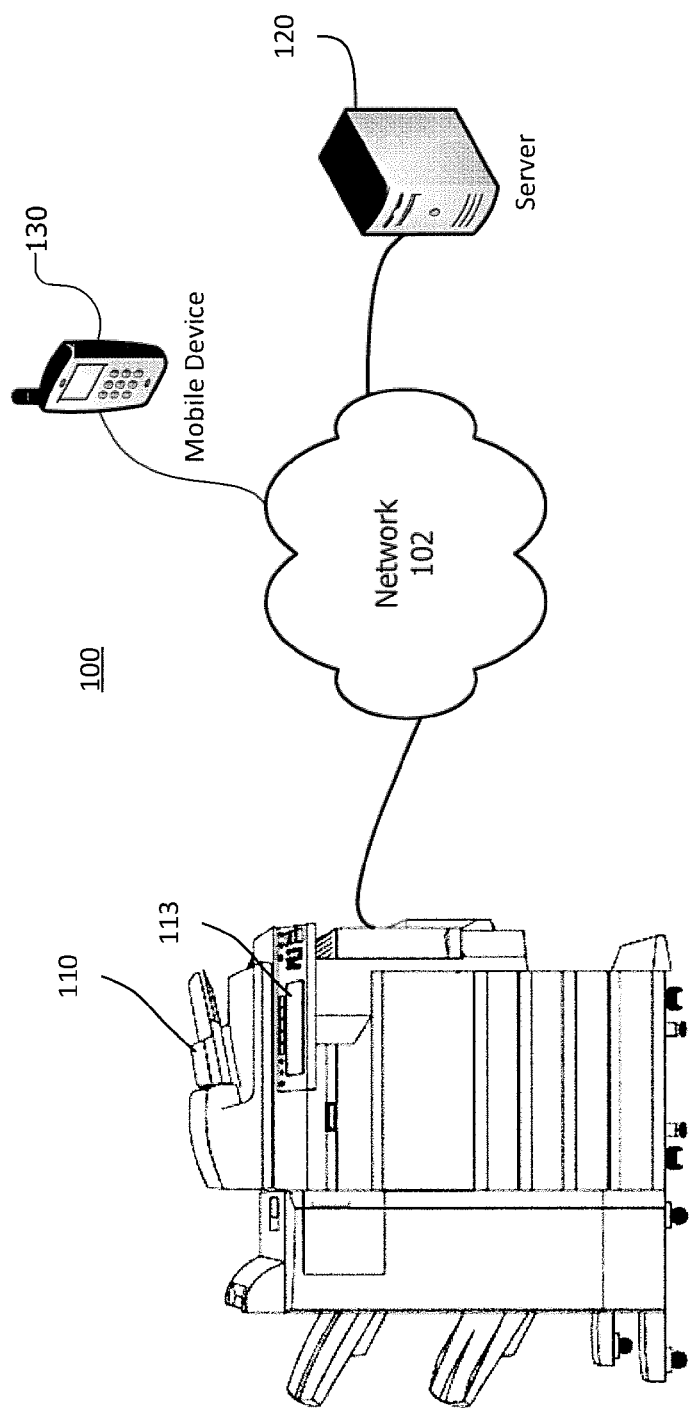
FIG. 1 is a diagram of an MFP system.

Referring now to FIG. 1 there is shown an MFP system 100. The system 100 includes an MFP 110, a server 120, and a mobile device 130, all interconnected by a network 102. The system 100 may be implemented in a distributed computing environment and interconnected by the network 102.

The network 102 may be a local area network, a wide area network, a personal area network, a mobile or telephone network, the Internet, an intranet, or any combination of these. The network 102 may have physical layers and transport layers according to IEEE 802.11, Ethernet or other wireless or wire-based communication standards and protocols such as WiMax, Bluetooth, mobile telephone and data protocols, the public switched telephone network, a proprietary communications network, infrared, and optical.

The MFP 110 may be equipped to receive portable storage media such as USB drives. The MFP 110 includes a user interface 113 subsystem which communicates information to and receives selections from users. The user interface subsystem 113 has a user output device for displaying graphical elements, text data or images to a user and a user input device for receiving user inputs. The user interface subsystem 113 may include a touchscreen, LCD display, touch-panel, alphanumeric keypad and/or an associated thin client through which a user may interact directly with the MFP 110.

The server 120 is software operating on a server computer connected to the network. The mobile device 130 may be a mobile or handheld PC, a table or smart phone, a feature phone, a smart watch, or other similar device. The mobile device 130 is representative of one or more end-user devices and may be considered separate from the system 100.

Figure 2:
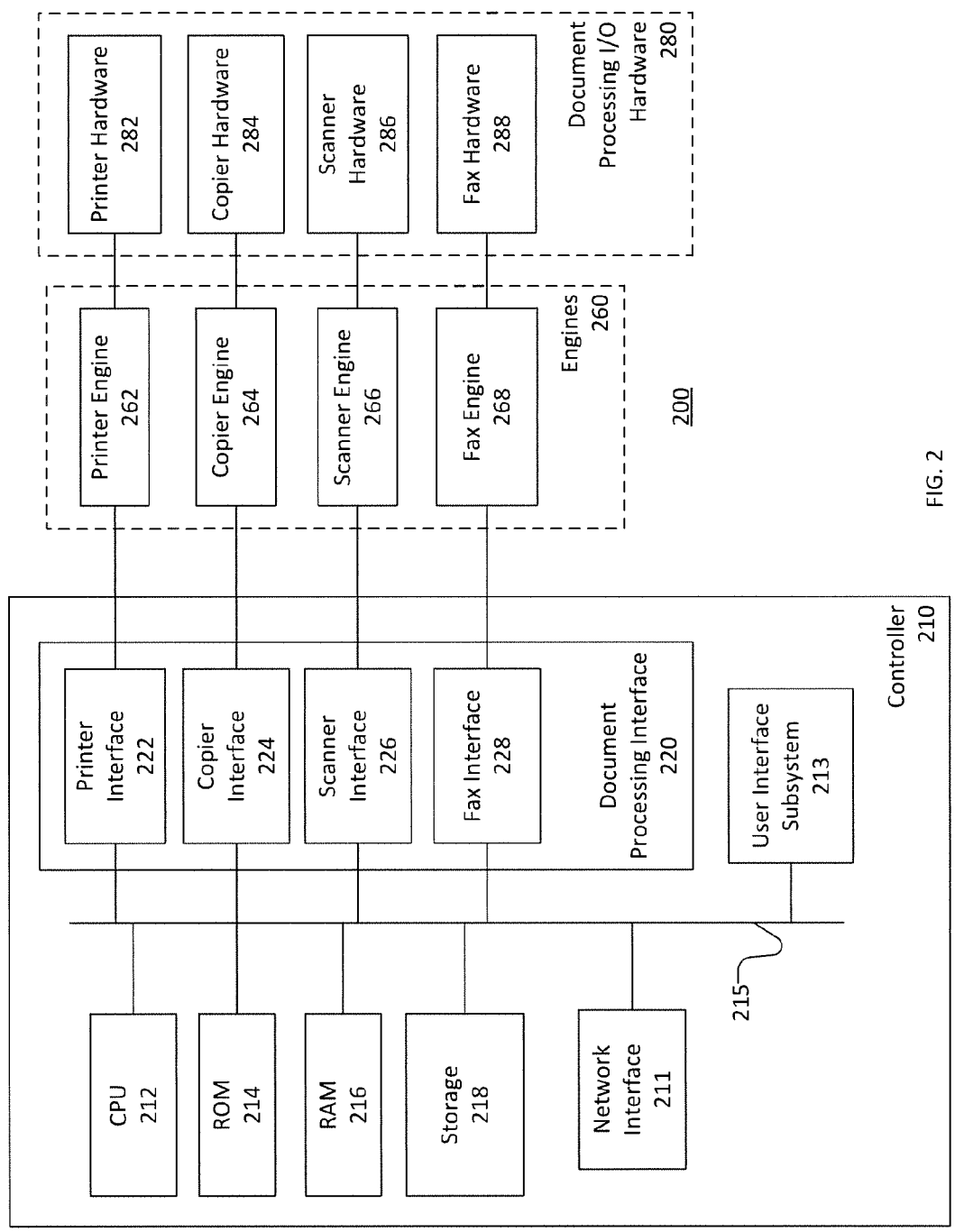
FIG. 2 is a block diagram of an MFP.

Turning now to FIG. 2 there is shown a block diagram of an MFP 200 which may be the MFP 110 (FIG. 1). The MFP 200 includes a controller 210, engines 260 and document processing I/O hardware 280. The controller 210 includes a CPU 212, a ROM 214, a RAM 216, a storage 218, a network interface 211, a bus 215, a user interface subsystem 213 and a document processing interface 220.

As shown in FIG. 2 there are corresponding components within the document processing interface 220, the engines 260 and the document processing I/O hardware 280, and the components are respectively communicative with one another. The document processing interface 220 has a printer interface 222, a copier interface 224, a scanner interface 226 and a fax interface 228. The engines 260 include a printer engine 262, a copier engine 264, a scanner engine 266 and a fax engine 268. The document processing I/O hardware 280 includes printer hardware 282, copier hardware 284, scanner hardware 286 and fax hardware 288.

The MFP 200 is configured for printing, copying, scanning and faxing. However, an MFP may be configured to provide other document processing functions, and, as per the definition, as few as two document processing functions.

The CPU 212 may be a central processor unit or multiple processors working in concert with one another. The CPU 212 carries out the operations necessary to implement the functions provided by the MFP 200. The processing of the CPU 212 may be performed by a remote processor or distributed processor or processors available to the MFP 200. For example, some or all of the functions provided by the MFP 200 may be performed by a server or thin client associated with the MFP 200, and these devices may utilize local resources (e.g., RAM), remote resources (e.g., bulk storage), and resources shared with the MFP 200.

The ROM 214 provides non-volatile storage and may be used for static or fixed data or instructions, such as BIOS functions, system functions, system configuration data, and other routines or data used for operation of the MFP 200.

The RAM 216 may be DRAM, SRAM or other addressable memory, and may be used as a storage area for data instructions associated with applications and data handling by the CPU 212.

The storage 218 provides volatile, bulk or long term storage of data associated with the MFP 200, and may be or include disk, optical, tape or solid state. The three storage components, ROM 214, RAM 216 and storage 218 may be combined or distributed in other ways, and may be implemented through SAN, NAS, cloud or other storage systems.

The network interface 211 interfaces the MFP 200 to a network, such as the network 102 (FIG. 1), allowing the MFP 200 to communicate with other devices.

The bus 215 enables data communication between devices and systems within the MFP 200. The bus 215 may conform to the PCI Express or other bus standard.

While in operation, the MFP 200 may operate substantially autonomously. However, the MFP 200 may be controlled from and provide output to the user interface subsystem 213, which may be the user interface subsystem 113 (FIG. 1).

The document processing interface 220 may be capable of handling multiple types of document processing operations and therefore may incorporate a plurality of interfaces 222, 224, 226 and 228. The printer interface 222, copier interface 224, scanner interface 226, and fax interface 228 are examples of document processing interfaces. The interfaces 222, 224, 226 and 228 may be software or firmware.

Each of the printer engine 262, copier engine 264, scanner engine 266 and fax engine 268 interact with associated printer hardware 282, copier hardware 284, scanner hardware 286 and facsimile hardware 288, respectively, in order to complete the respective document processing functions.

Figure 3:
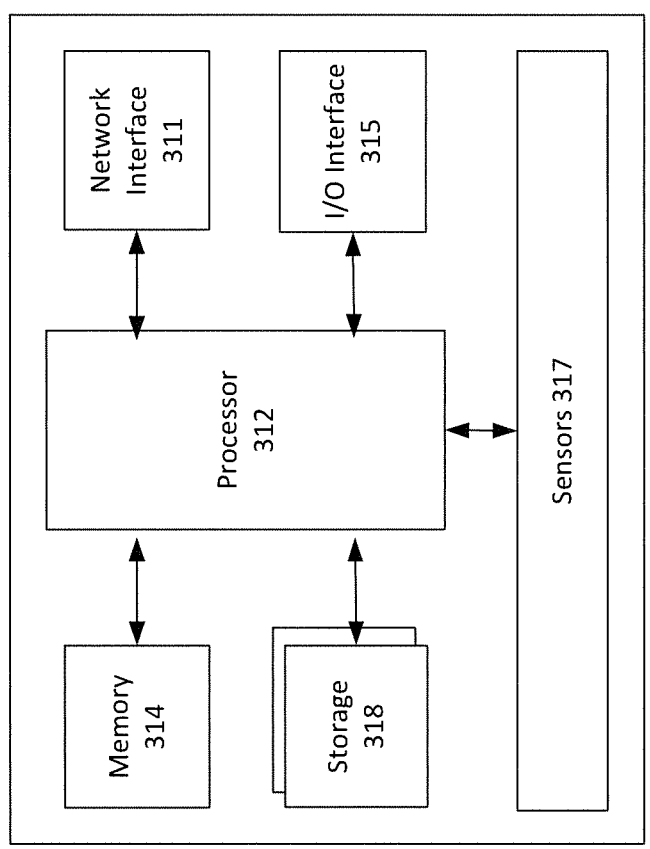
FIG. 3 is a block diagram of a computing device.

Turning now to FIG. 3 there is shown a computing device 300, which is representative of the server computers, client devices, mobile devices and other computing devices discussed herein. The controller 210 (FIG. 2) may also, in whole or in part, incorporate a general purpose computer like the computing device 300. The computing device 300 may include software and/or hardware for providing functionality and features described herein. The computing device 300 may therefore include one or more of: logic arrays, memories, analog circuits, digital circuits, software, firmware and processors. The hardware and firmware components of the computing device 300 may include various specialized units, circuits, software and interfaces for providing the functionality and features described herein.

The computing device 300 has a processor 312 coupled to a memory 314, storage 318, a network interface 311 and an I/O interface 315. The processor may be or include one or more microprocessors, field programmable gate arrays (FPGAs), application specific integrated circuits (ASICs), programmable logic devices (PLDs) and programmable logic arrays (PLAs).

The memory 314 may be or include RAM, ROM, DRAM, SRAM and MRAM, and may include firmware, such as static data or fixed instructions, BIOS, system functions, configuration data, and other routines used during the operation of the computing device 300 and processor 312. The memory 314 also provides a storage area for data and instructions associated with applications and data handled by the processor 312.

The storage 318 provides non-volatile, bulk or long term storage of data or instructions in the computing device 300. The storage 318 may take the form of a disk, tape, CD, DVD, or other reasonably high capacity addressable or serial storage medium. Multiple storage devices may be provided or available to the computing device 300. Some of these storage devices may be external to the computing device 300, such as network storage or cloud-based storage.

The network interface 311 includes an interface to a network such as network 102 (FIG. 1).

The I/O interface 315 interfaces the processor 312 to peripherals (not shown) such as displays, keyboards and USB devices.

The sensors 317 may be integrated into the computing device or available to the computing device and may include accelerometers, gravitometers, gyroscopes, motion detectors, still cameras, video cameras, infrared sensors, proximity sensors, touch sensors, power sensors and similar sensors.

Figure 4:
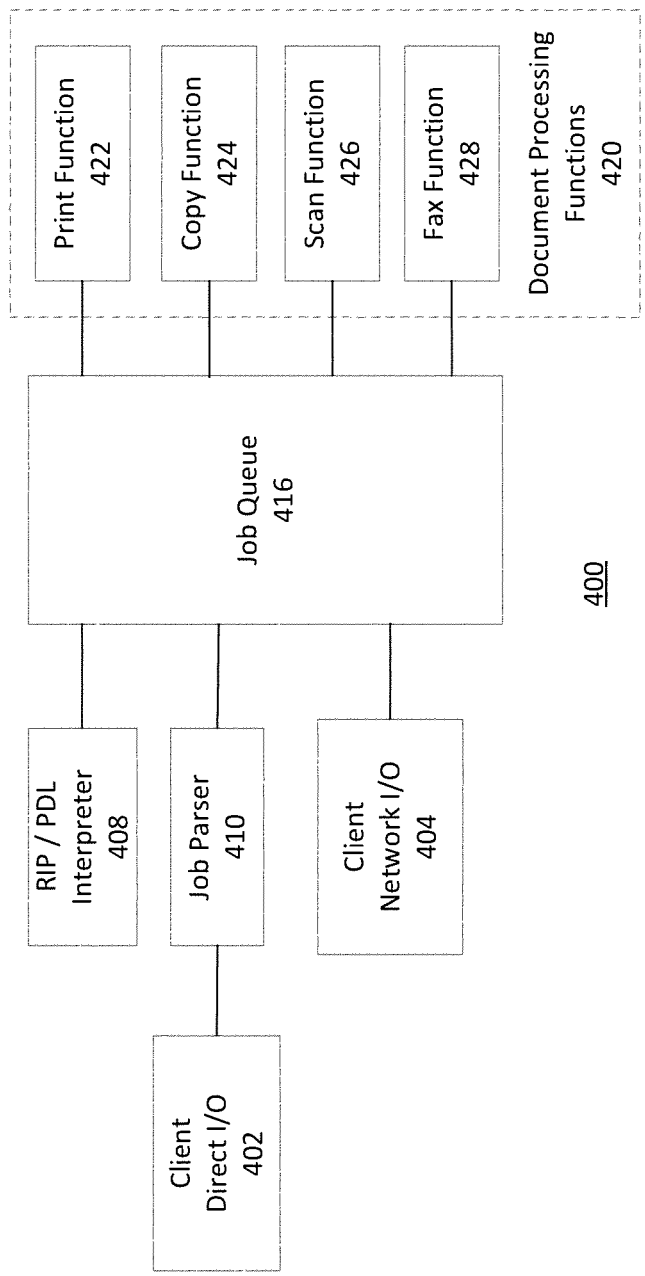
FIG. 4 is a block diagram of a software system for an MFP.

Turning now to FIG. 4 there is shown a block diagram of a software system 400 of an MFP which may operate on the controller 210. The system 400 includes client direct I/O 402, client network I/O 404, a RIP/PDL interpreter 408, a job parser 410, a job queue 416, a series of document processing functions 420 including a print function 422, a copy function 424, a scan function 426 and a fax function 428.

The client direct I/O 402 and the client network I/O 404 provide input and output to the MFP controller. The client direct I/O 402 is for the user interface on the MFP (e.g., user interface subsystem 113), and the client network I/O 404 is for user interfaces over the network. This input and output may include documents for printing or faxing or parameters for MFP functions. In addition, the input and output may include control of other operations of the MFP. The network-based access via the client network I/O 404 may be accomplished using HTTP, FTP, UDP, electronic mail TELNET or other network communication protocols.

The RIP/PDL interpreter 408 transforms PDL-encoded documents received by the MFP into raster images or other forms suitable for use in MFP functions and output by the MFP. The RIP/PDL interpreter 408 processes the document and adds the resulting output to the job queue 416 to be output by the MFP.

The job parser 410 interprets a received document and relays it to the job queue 416 for handling by the MFP. The job parser 410 may perform functions of interpreting data received so as to distinguish requests for operations from documents and operational parameters or other elements of a document processing request.

The job queue 416 stores a series of jobs for completion using the document processing functions 420. Various image forms, such as bitmap, page description language or vector format may be relayed to the job queue 416 from the scan function 426 for handling. The job queue 416 is a temporary repository for all document processing operations requested by a user, whether those operations are received via the job parser 410, the client direct I/O 402 or the client network I/O 404. The job queue 416 and associated software is responsible for determining the order in which print, copy, scan and facsimile functions are carried out. These may be executed in the order in which they are received, or may be influenced by the user, instructions received along with the various jobs or in other ways so as to be executed in different orders or in sequential or simultaneous steps. Information such as job control, status data, or electronic document data may be exchanged between the job queue 416 and users or external reporting systems.

The job queue 416 may also communicate with the job parser 410 in order to receive PDL files from the client direct I/O 402. The client direct I/O 402 may include printing, fax transmission or other input of a document for handling by the system 400.

The print function 422 enables the MFP to print documents and implements each of the various functions related to that process. These include stapling, collating, hole punching, and similar functions. The copy function 424 enables the MFP to perform copy operations and all related functions such as multiple copies, collating, 2 to 1 page copying or 1 to 2 page copying and similar functions. Similarly, the scan function 426 enables the MFP to scan and to perform all related functions such as shrinking scanned documents, storing the documents on a network or emailing those documents to an email address. The fax function 428 enables the MFP to perform facsimile operations and all related functions such as multiple number fax or auto-redial or network-enabled facsimile.

Some or all of the document processing functions 420 may be implemented on a client computer, such as a personal computer or thin client. The user interface for some or all document processing functions may be provided locally by the MFP's user interface subsystem though the document processing function is executed by a computing device separate from but associated with the MFP.

Figure 5:
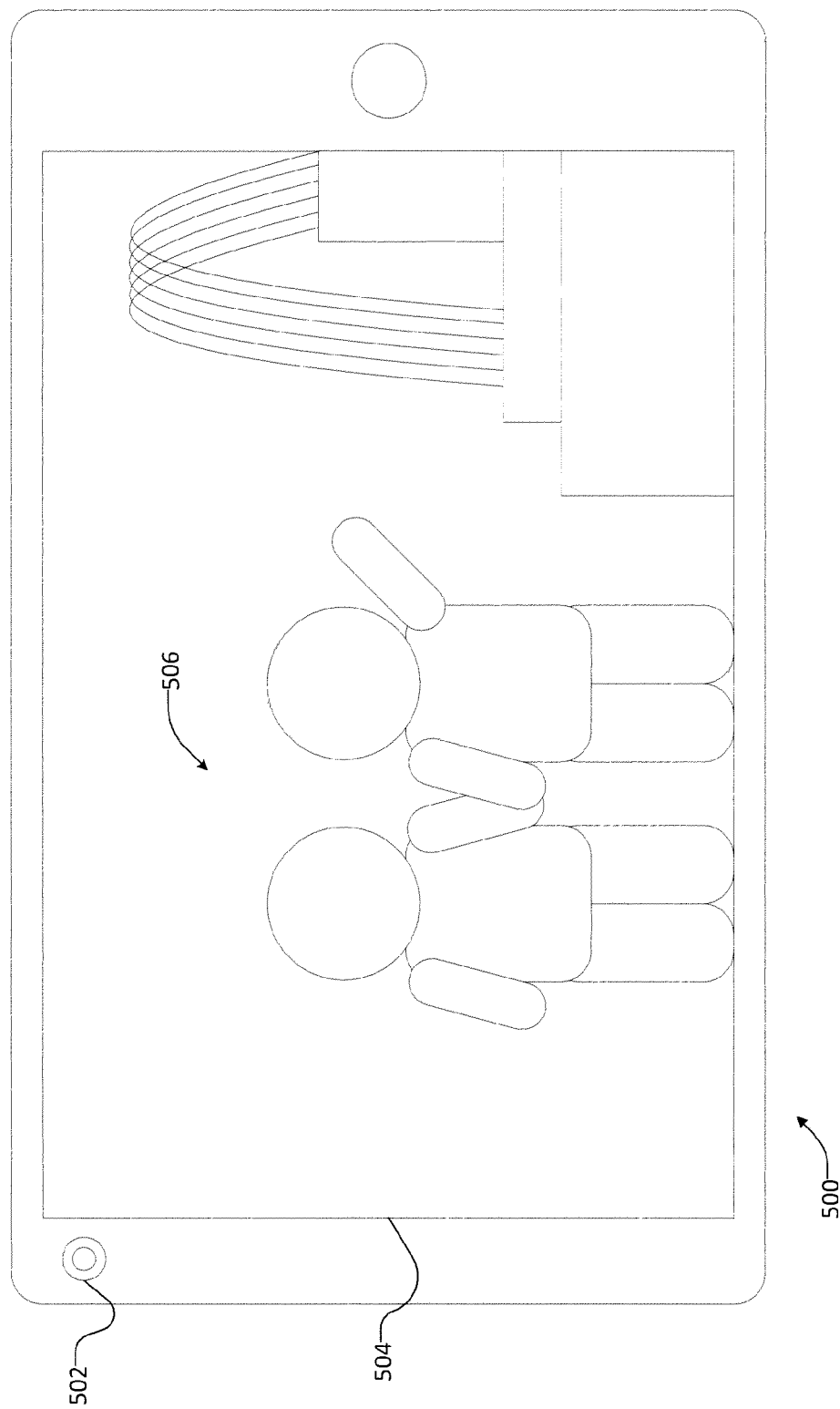
FIG. 5 is a mobile device in a landscape orientation with a visible image.

Turning now to FIG. 5 a mobile device 500 in a landscape orientation with a visible image 506 is shown. The mobile device 500 may be a tablet, a smart phone, a feature phone, a smart watch or a similar device. The mobile device 500 may have a camera 502 suitable for taking images such as the image 506 shown on the user interface 504. In the mobile device 500 shown, the image 506 depicting two people fills the entire user interface 504.

In some cases, a border for the image 506 may be visible. In such cases, on-screen buttons, dials, and other controls may enable a user to interact with the image 506. For example, a user may adjust the image quality, tone, contrast, or color. A user may eliminate "red-eye" or otherwise interact with the image 506. In situations in which the image 506 fills the entire user interface 504, these controls may be presented in the form of an overlay that is visible or not-visible based upon received user interactions with the user interface 504.

Through interaction with the mobile device 500, viewing attributes for an image 506 may be adjusted. As used herein the phrase "viewing attributes" means attributes associated with the display of an image or other document that result in no change to the data content of the image, but do result in a different view of the image from a user's perspective. For example, altering the contrast of an image changes the underlying data content of an image, but zooming into a portion of an image, focusing the display on a portion of the image, or altering the orientation of the display does not alter the underlying data content.

As the viewing attributes are adjusted, all or a portion of the image may appear larger or in a different position, relative to the display as a whole, to a viewer. In many cases, this manipulation may take place through user touch interaction with the user interface 504. In other cases, a selector, controller, or similar physical user interface device may enable a user to adjust viewing attributes for an image on a mobile device.

Figure 6:
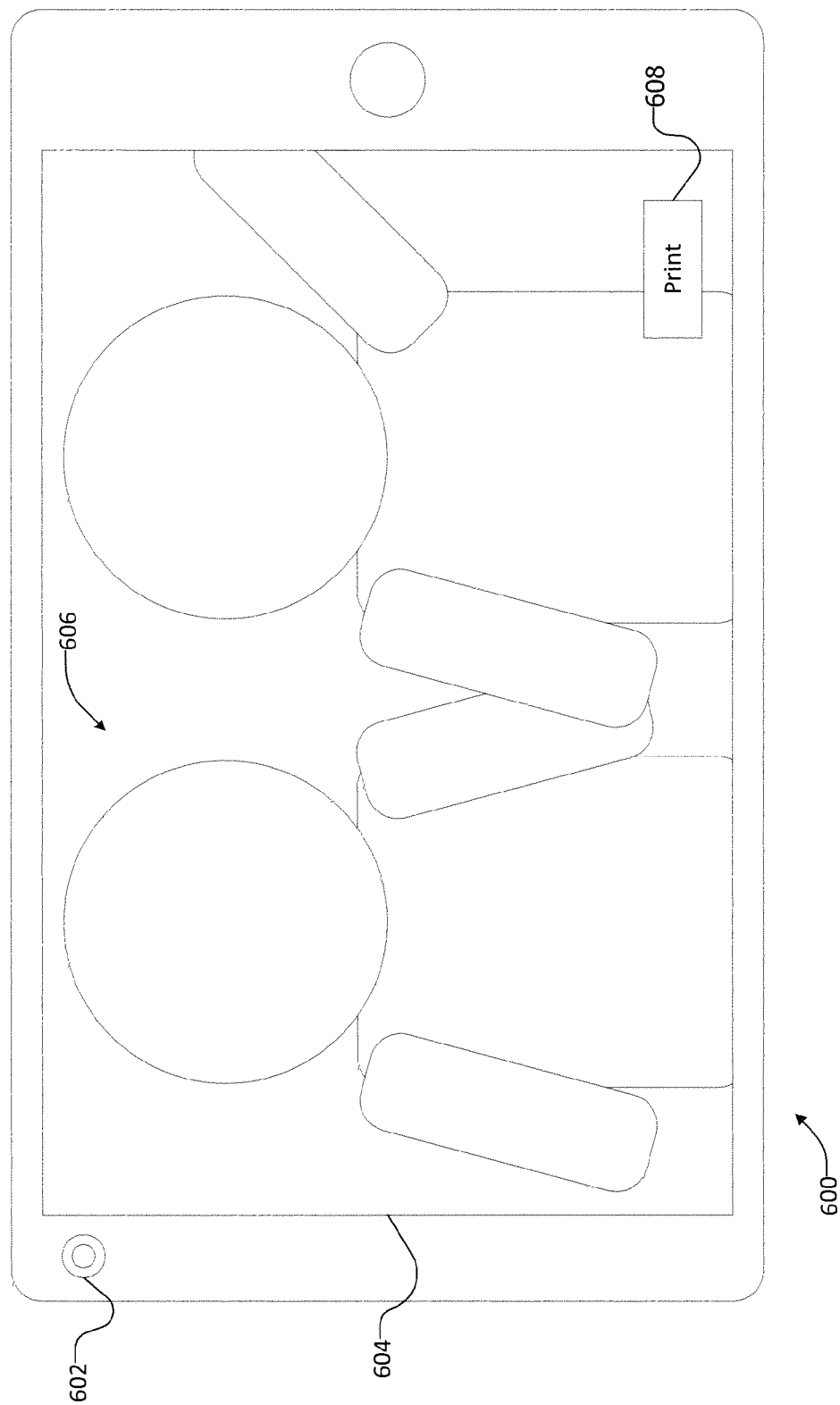
FIG. 6 is a mobile device in a landscape orientation with a visible, zoomed image.

FIG. 6 is a mobile device 600 in a landscape orientation with a visible, zoomed image 606. This mobile device 600 may be the same mobile device 500 from FIG. 5 including the same camera 602.

The image 606 shown in the user interface 604 is zoomed and positioned with the focus on the two individuals. It is so zoomed that the legs of the individuals and the fountain are no longer visible in the image 606. Once the user has zoomed the image 606, further user interaction may invoke a menu or elements of the user interface 604 suitable for performing functions.

A print button overlay 608, for example, is shown. Other document processing functions, such as facsimile, cloud storage, and email may also be available depending on the capabilities of the mobile device and/or the MFP. A user selecting the print function may submit the image 606 shown in the user interface 604 to an MFP for printing. Similar functions may be available for the other document processing functions.

Figure 7:
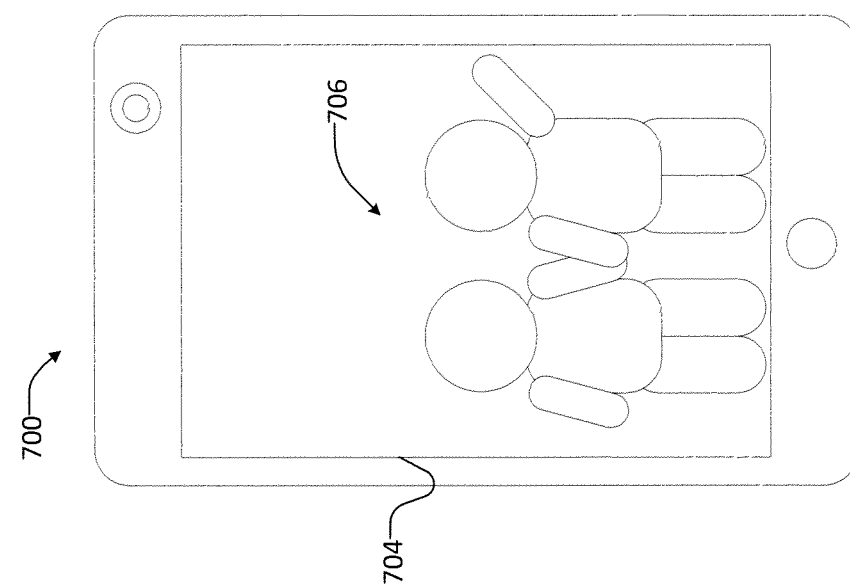
FIG. 7 is a mobile device in a portrait orientation with a visible image zoomed and positioned so that a portion of an image is visible.

FIG. 7 is a mobile device 700 in a portrait orientation with a visible image 706 zoomed and positioned so that a portion of an image is visible. The user interface 704 shows the same image 706 as shown in FIGS. 5 and 6. However, because the mobile device 700 is in a portrait orientation, the portion of the image 706 showing the fountain is no longer visible on the user interface 704.

Figure 8:
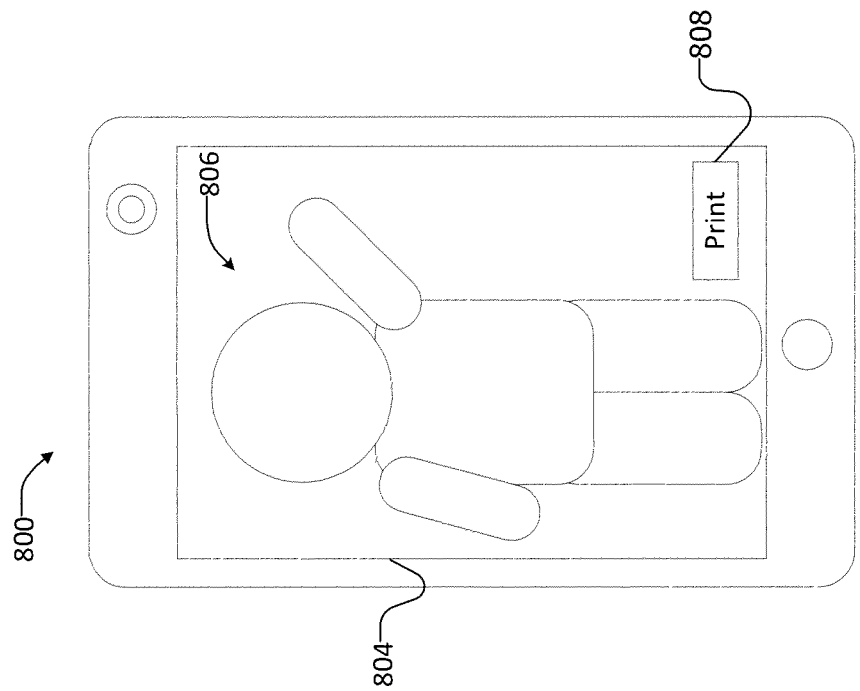
FIG. 8 is a mobile device in a portrait orientation with a visible image zoomed and positioned so that a smaller portion of an image is visible.

FIG. 8 is a mobile device 800 in a portrait orientation with a visible image 806 zoomed and positioned so that a smaller portion of an image is visible. The image 806 is zoomed such that only one of the individuals is visible in the user interface 804. The print button overlay 808, like the print button overlay 608 of FIG. 6 is also shown.

In each of FIGS. 5-8, an image of two individuals is shown. However, virtually any other document type may be treated in a similar fashion. For example, a portable document format (PDF) document or Microsoft® Word document or Microsoft® Excel spreadsheet document may be orientated, zoomed, positioned and otherwise have viewing characteristics of the document altered by a users of a mobile device. These and other types of documents are also suitable for use in the systems and methods described in this patent.

Description of Processes

Figure 9:
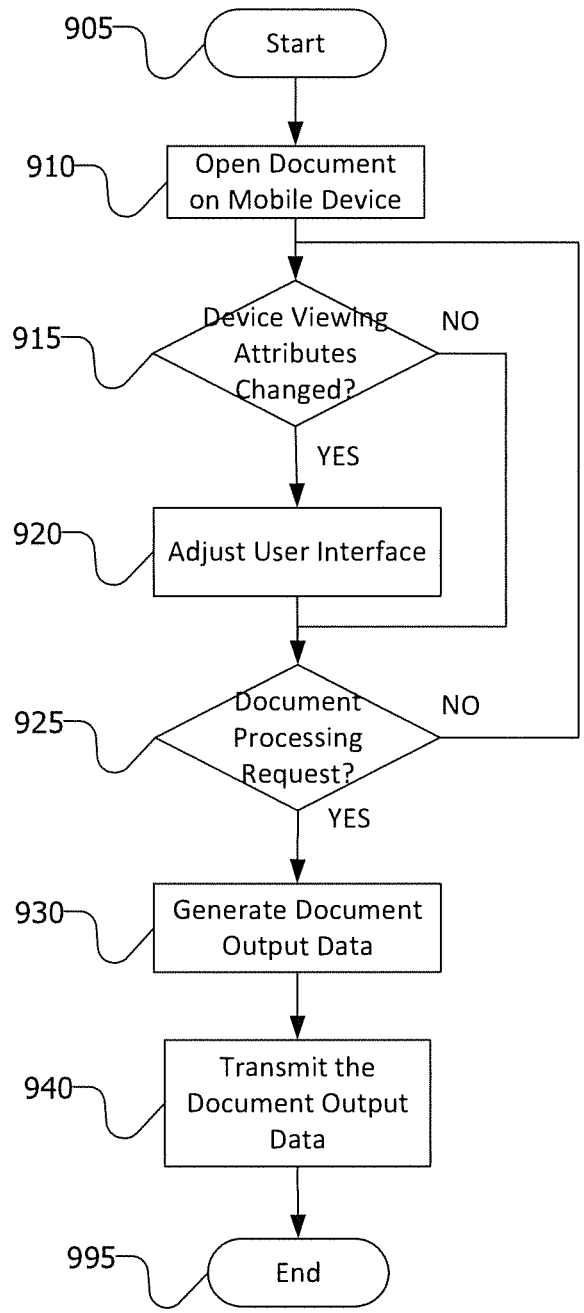
FIG. 9 is a flowchart for the operation of the mobile device software.

Turning now to FIG. 9, a flowchart for the operation of the mobile device software is shown. FIG. 9 has a start 905 and an end 995, but may be iterative. Many instances of the process shown in FIG. 9 may be taking place simultaneously or in parallel.

First, a document is opened on a mobile device at 910. This process may involve the opening of the document in an application designed specifically to interface with a particular type or brand of MFP. This process may instead involve opening the document in a general purpose mobile application, such as a photo viewing application, a document editing application, a web browser or other similar application.

As the user interacts with the user interface of the mobile device, the user may alter the viewing attributes of the document at 915. These alterations may be made, as described above, through user interaction with a touchscreen display showing the document or user interface elements. These alterations may be made with hardware buttons, switches, controllers or other elements.

As those viewing attributes are changed, the user interface is suitably adjusted to correspond to those viewing attributes adjustments at 920. In this step, the zoom level associated with the document, the orientation of the document, the positioning of the document are updated to correspond to the received user interactions. This updating may be understood to alter the "view" of the document. The data making up the document itself is not being changed, merely the perspective or "view" of the user within the user interface.

If the viewing attributes are not changed at 915 or once the viewing attributes are updated, the mobile device may then receive a document processing request input by the user via the user interface at 925. For example, this document processing request may be input via the print button overlay shown in FIGS. 6. (608) and 8 (808). This request may take into account the current viewing attributes of the document and generate the request such that the resulting document processing request incorporates the current positioning, zoom, and orientation of the document for which the request is generated.

Once the document processing request is received at 925, the document output data is generated at 930. The document output data includes the current zoom and current position of the document. The document output data may also include the current orientation of the document. This orientation data may, in some cases, be drawn from a sensor in the mobile device that indicates whether the mobile device is currently being held in a portrait or a landscape (or some other) orientation. A gyroscope and gravitometer may be sensors that, together, generate orientation data.

When used, the orientation, derived from these sensors, may result in the document output data for the document indicating that the document displayed on the mobile device should be output in the same orientation. For example, if a user has framed a document on the mobile device in a manner such as that shown in FIG. 6, then the resulting output document will print in landscape mode. Similarly, the zoom and position of the image will also be incorporated into the resulting document output data at 930.

Next, the document output data is transmitted to an MFP at 940. In this way, the document processing operation is already completed by the mobile device in a format suitable for immediate output by the MFP. However, the document processing operation is formatted in such a way that the resulting document (physical or otherwise) output by the MFP appears in substantially the same way as that shown on the user interface of the mobile device. In some cases, this is known as what-you-see-is-what-you-get output.

Once the document output data is transmitted, the user interaction with the mobile device is complete and the MFP will output the document in a form substantially the same as that shown on the user interface of the mobile device.

Figure 10:
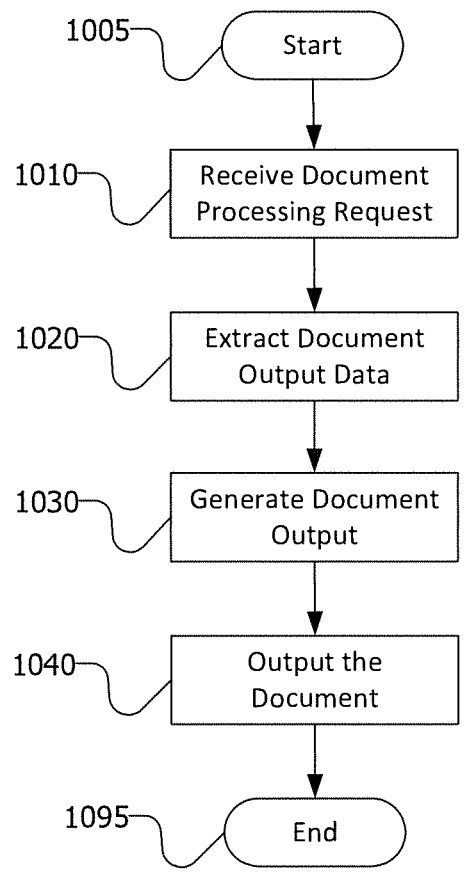
FIG. 10 is a flowchart for the operation of the multifunction peripheral.

Referring to FIG. 10, a flowchart for the operation of the multifunction peripheral is shown. FIG. 10 has a start 1005 and an end 1095, but may be iterative. Many instances of the process shown in FIG. 10 may be taking place simultaneously or in parallel.

Once a mobile device transmits a document processing request including the document output data (FIG. 9, element 940), the MFP will receive the document processing request at 1010. Once received, the MFP may extract the document output data 1020 including the zoom, positioning and, if included, orientation. The resulting document will appear just as it appeared on the mobile device.

In response to this data, the MFP will generate document output at 1030 in which the document is formed for output via printing, facsimile, storage on a network storage or in cloud storage, or otherwise prepared output as directed by the document output data. Next, the MFP outputs the document at 1040.

Closing Comments

Throughout this description the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A method for mobile device control of multifunction peripheral output comprising:

opening a document such that the document is visible on a user interface of a mobile device;

receiving interaction with the user interface resulting in a user modifying viewing attributes for the document, the viewing attributes including a zoom level and a position of the document on the user interface, the viewing attributes together defining a view of the document visible on the user interface;
adjusting the user interface to display the document according to the view such that only a portion of the document is visible on the user interface;
receiving interaction with the user interface displaying the document according to the view requesting transmission of the document in a form substantially identical to the view to a multifunction peripheral for output;
immediately, in response to the interaction requesting transmission of the document, generating document output data comprising the document according to the view in a form suitable for output by a multifunction peripheral;
transmitting the document output data to a multifunction peripheral for output such that the document is output by the multifunction peripheral according to the view defined on the user interface of the mobile device.

2. The method of claim 1 wherein the viewing attributes further include document orientation.

3. The method of claim 2 wherein the mobile device uses a sensor to detect the current mobile device orientation and wherein the document orientation is derived from the current mobile device orientation.

4. The method of claim 1 further comprising:
receive user selection of a number of copies to output; and
transmitting the selected number of copies to output to the multifunction peripheral along with the document output data.

5. The method of claim 1 wherein the view is defined in such a way that the document output by the multifunction peripheral is substantially the same as that visible on the user interface of the mobile device.

6. An apparatus, including a processor and associated memory, the apparatus including software that when executed by the processor causes the processor to:
open a document such that the document is visible on a user interface of a mobile device;
receive interaction with the user interface resulting in user modification of viewing attributes for the document, the viewing attributes including a zoom level and a position of the document on the user interface, the viewing attributes together defining a view of the document visible on the user interface;
adjust the user interface to display the document according to the view such that only a portion of the document is visible on the user interface;
receive interaction with the user interface displaying the document according to the view requesting transmission of the document in a form substantially identical to the view to a multifunction peripheral for output;
immediately, in response to the interaction requesting transmission of the document, generate document output data comprising the document according to the view in a form suitable for output by a multifunction peripheral;
transmit the document output data to a multifunction peripheral for output such that the document is output by the multifunction peripheral according to the view defined on the user interface of the mobile device.

7. The apparatus of claim 6 wherein the viewing attributes further include document orientation.

8. The apparatus of claim 7 wherein the mobile device uses a sensor to detect the current mobile device orientation and wherein the document orientation is derived from the current mobile device orientation.

9. The apparatus of claim 6 wherein the software, when executed by the processor, causes the processor to:
receive user selection of a number of copies to output; and
transmit the selected number of copies to output to the multifunction peripheral along with the document output data.

10. The apparatus of claim 6 wherein the view is defined in such a way that the document output by the multifunction peripheral is substantially the same as that visible on the user interface of the mobile device.

11. Apparatus comprising a mobile device for control of multifunction peripheral output:
a user interface of a mobile device for receiving interaction with the user interface resulting in user modification of viewing attributes for a document, the viewing attributes including a zoom level and a position of the document on the user interface, the viewing attributes together defining a view of the document visible on the user interface, the user interface further for adjusting the user interface to display the document according to the view such that only a portion of the document is visible on the user interface, and for receiving interaction with the user interface displaying the document according to the view requesting transmission of the document in a form substantially identical to the view to a multifunction peripheral for output;
a processor for, in response to the interaction requesting transmission of the document, generating document output data comprising the document according to the view in a form suitable for output by a multifunction peripheral; and
a network interface for transmitting the document output data to a multifunction peripheral for output such that the document is output by the multifunction peripheral according to the view defined on the user interface of the mobile device.

12. The apparatus of claim 11 wherein the viewing attributes further include document orientation.

13. The apparatus of claim 12 wherein the mobile device uses a sensor to detect the current mobile device orientation and wherein the document orientation is derived from the current mobile device orientation.

14. The apparatus of claim 11 wherein:
the user interface is further for receiving user selection of a number of copies to output; and
the network interface is further for transmitting the selected number of copies to output to the multifunction peripheral along with the document output data.

15. The apparatus of claim 11 wherein the view is defined in such a way that the document output by the multifunction peripheral is substantially the same as that visible on the user interface of the mobile device.

* * * * *